(12) United States Patent
Kim

(10) Patent No.: US 12,354,519 B2
(45) Date of Patent: Jul. 8, 2025

US012354519B2

(54) DISPLAY DEVICE AND METHOD OF CONTROLLING AN ON-BIAS STRESS (OBS) PERIOD

(71) Applicant: LG Display Co., Ltd., Seoul (KR)

(72) Inventor: Jae Hyoung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 58 days.

(21) Appl. No.: 18/225,926

(22) Filed: Jul. 25, 2023

(65) Prior Publication Data

US 2024/0212565 A1 Jun. 27, 2024

(30) Foreign Application Priority Data

Dec. 22, 2022 (KR) ........................ 10-2022-0181784

(51) Int. Cl.

*G09G 3/20* (2006.01)
*G09G 3/3233* (2016.01)
*G09G 3/3266* (2016.01)

(52) U.S. Cl.

CPC ......... *G09G 3/2092* (2013.01); *G09G 3/3233* (2013.01); *G09G 3/3266* (2013.01); *G09G 2300/0819* (2013.01); *G09G 2300/0842* (2013.01); *G09G 2300/0861* (2013.01); *G09G 2310/0262* (2013.01); *G09G 2310/08* (2013.01);

(Continued)

(58) Field of Classification Search

CPC .. G09G 3/2092; G09G 3/3233; G09G 3/3266; G09G 2300/0819; G09G 2300/0842; G09G 2300/0861; G09G 2310/0262; G09G 2310/08; G09G 2320/0247; G09G 2320/045; G09G 2330/021; G09G 3/3648; G09G 3/3677; G09G 2320/0233; G09G 3/3275; G09G 2300/0809; G09G 2340/0435; H01L 29/7869

See application file for complete search history.

(56) References Cited

U.S. PATENT DOCUMENTS 11,315,489 B1 * 4/2022 Heganovic ........... G09G 3/3283
2007/0115244 A1 * 5/2007 Shin ..................... G09G 3/3266 345/100

(Continued)

FOREIGN PATENT DOCUMENTS

CN 113450730 A * 9/2021 ........... G09G 3/3406

OTHER PUBLICATIONS

Li et al., Machine Translation of Foreign Patent Document CN 113450730A, Backlight compensation method, device, system and storage medium, Sep. 28, 2021, pp. 1-36 (Year: 2021).*

*Primary Examiner* — Amr A Awad
*Assistant Examiner* — Maheen I Javed
(74) *Attorney, Agent, or Firm* — Birch, Stewart, Kolasch & Birch, LLP

(57) ABSTRACT

A display device can include a display panel including a plurality of subpixels with each subpixel including a light-emitting element, and a data driver configured to supply a data voltage and an on-bias stress (OBS) voltage to each of the subpixels. The display device can further include a scan driver configured to output an emission signal for controlling a non-emission period and an emission period of the light-emitting element and an OBS signal for controlling an OBS period, and a controller configured to control the data driver and the scan driver.

10 Claims, 8 Drawing Sheets

(52) U.S. Cl.
CPC ............... *G09G 2320/0247* (2013.01); *G09G 2320/045* (2013.01); *G09G 2330/021* (2013.01)

(56) References Cited

U.S. PATENT DOCUMENTS

| | | | | |
|---|---|---|---|---|
| 2016/0372028 | A1 * | 12/2016 | Park ..................... | G09G 3/2096 |
| 2020/0013354 | A1 * | 1/2020 | Han ..................... | G09G 3/3611 |

* cited by examiner

FIG. 9

| PTN | CASE I (@60℃ 504hr) | CASE II (@60℃ 504hr) |
|---|---|---|
| W255 | -10% | -9% |
| W63 | -22% | -19% |

DISPLAY DEVICE AND METHOD OF CONTROLLING AN ON-BIAS STRESS (OBS) PERIOD

CROSS-REFERENCE TO RELATED APPLICATIONS

This application claims priority to Korean Patent Application No. 10-2022-0181784, filed in the Republic of Korea on Dec. 22, 2022, the entire contents of which are hereby expressly incorporated by reference into the present application.

BACKGROUND OF THE INVENTION

Field of the Invention

The present disclosure relates to a display device and a method of driving the same.

Discussion of the Related Art

As information technology has developed, the importance of a display device as a connection medium between a user and information has been increasing, and various types of display devices such as an electroluminescent display device and a liquid crystal display device have been utilized.

In order to reduce power consumption, such a display device can be driven at a driving frequency lower than that of a normal driving mode in a low-power mode, a low-speed driving mode, etc.

By applying a low-speed driving method, a power reduction effect can be obtained. However, image quality degradation can occur. For example, during a low-speed driving, a luminance deviation between frames can increase, and thus a flickering phenomenon can occur. Therefore, there is a need for a method capable of addressing the image quality deterioration which may occur when the display device is driven at a low speed.

SUMMARY OF THE INVENTION

Accordingly, the present disclosure is directed to a display device and a method of driving the same that substantially obviate one or more problems due to limitations and disadvantages of the related art.

An object of the present disclosure is to provide a display device and a method of driving the same capable of preventing or minimizing a flickering phenomenon during a low-speed driving.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, a display device includes a display panel including a plurality of subpixels with each subpixel including a light-emitting element, a data driver configured to supply a data voltage and an on-bias stress (OBS) voltage to each of the subpixels, a scan driver configured to output an emission signal for controlling a non-emission period and an emission period of the light-emitting element and an OBS signal for controlling an OBS period, and a controller. The controller controls the data driver to supply the data voltage to each of the subpixels in the emission period to emit light, and controls the data driver to supply the OBS voltage to each of the subpixels in the non-emission period during a first frame period, Further, the controller controls the data driver to supply the OBS voltage to each of the subpixels in the non-emission period and maintains the data voltage supplied in the first frame period in the emission period to emit light during a second frame period. Furthermore, the controller controls the scan driver to set an OBS period performed in the non-emission period of the second frame period to be twice or more longer than an OBS period nearest to before last the emission period of the first frame period.

In another aspect of the present disclosure, a method of driving a display device including a display panel including a plurality of subpixels with each subpixel including a light-emitting element, can include supplying a data voltage to each of the subpixels in a emission period to emit light and to supply an OBS voltage to each of the subpixels in a non-emission period during a first frame period, and supplying an OBS voltage to each of the subpixels in a non-emission period and maintaining the data voltage supplied in the first frame period to emit light in an emission period during a second frame period, wherein an OBS period performed in the non-emission period of the second frame period is set to be twice or more longer than an OBS period performed nearest to the last emission period of the first frame period.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 9 is an example of a simulation result of a current drop rate according to the driving waveforms of FIG. 8.

DETAILED DESCRIPTION OF THE EMBODIMENTS

Figure 1:
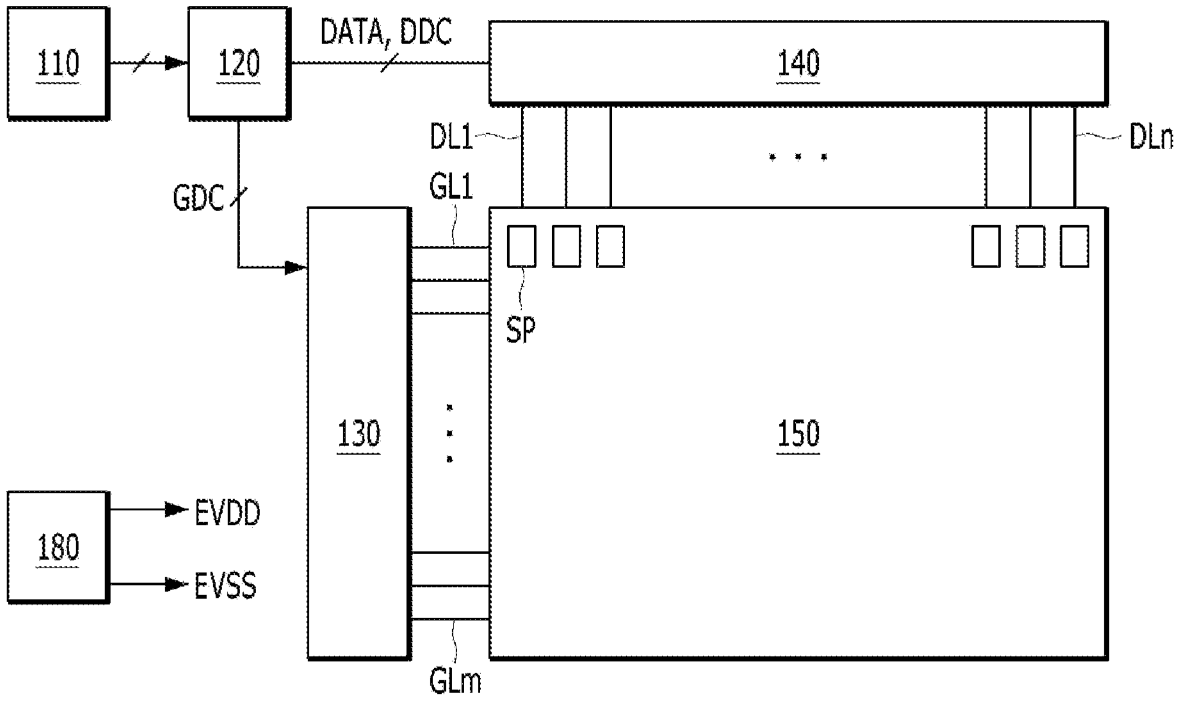
FIG. 1 is a block diagram schematically illustrating a configuration of a display device according to an embodiment of the present disclosure.

The advantages and features of the present disclosure, and the method for achieving the advantages and features will become apparent with reference to embodiments described below in detail in conjunction with the accompanying drawings. However, the present disclosure is not limited to the embodiments disclosed below and can be implemented in a variety of different forms, and these embodiments allow the present disclosure to be complete and are provided to fully inform those of ordinary skill in the art to which the present disclosure belongs of the scope of the disclosure.

The shapes, sizes, proportions, angles, numbers, etc. disclosed in the drawings for describing the embodiments of the present disclosure are illustrative, and thus the present disclosure is not limited to the illustrated elements. The same reference symbol refers to the same element throughout the specification. When "including", "having", "comprising", etc. are used in this specification, other parts can also be present, unless "only" is used. When an element is expressed in the singular, the case including the plural is included unless explicitly stated otherwise.

In interpreting an element, it is to be interpreted as including an error range even when there is no separate explicit description thereof.

In the case of a description of a positional relationship, for example, when a positional relationship between two parts is described using "on", "above", "over," "below", "next to", etc., one or more other parts can be located between the two parts, unless "immediately" or "directly" is used.

Although "first", "second", etc. are used to describe various elements, these elements are not limited by these terms. These terms are merely used to distinguish one element from another and may not define any order or sequence. Accordingly, a first element mentioned below can be a second element within the spirit of the present disclosure.

In addition, a pixel circuit and a gate driver of a display device described below according to one or more embodiments of the present disclosure can each include a plurality of transistors. The transistors can be implemented as oxide TFTs (thin film transistors) including oxide semiconductors, LTPS TFTs including LTPS, etc. Each of the transistors can be implemented with a p-channel TFT or an n-channel TFT.

A transistor is a three-electrode element including a gate, a source, and a drain. The source is an electrode that supplies a carrier to the transistor. Within the transistor, the carrier starts flowing from the source. The drain is an electrode through which the carrier exits the transistor. The carrier flows through the transistor flows from the source to the drain. In the case of an n-channel transistor, the carrier is an electron, and thus a source voltage is lower than a drain voltage so that the electron can flow from the source to the drain. A direction of current in an n-channel transistor is from the drain to the source. In the case of a p-channel transistor, the carrier is a hole, and thus the source voltage is higher than the drain voltage so that the hole can flow from the source to the drain. In the p-channel transistor, since the hole flows from the source to the drain, current flows from the source to the drain. It should be noted that the source and drain of the transistor are not fixed. For example, the source and drain can change depending on the applied voltage. Therefore, the disclosure is not limited by the source and drain of the transistor. In the following description, the source and drain of the transistor will be referred to as a first electrode and a second electrode.

A gate signal swings between a gate-on voltage and a gate-off voltage. The gate-on voltage is set to a voltage higher than a threshold voltage of the transistor, and the gate-off voltage is set to a voltage lower than the threshold voltage of the transistor. The transistor is turned on in response to the gate-on voltage, while being turned off in response to the gate-off voltage. In the n-channel transistor, the gate-on voltage can be a gate-high voltage VGH, and the gate-off voltage can be a gate-low voltage VGL. In the p-channel transistor, the gate-on voltage can be a gate-low voltage VGL, and the gate-off voltage can be a gate-high voltage VGH.

Each of the pixels of an electroluminescent display device includes a light-emitting element and a driving element that drives the light-emitting element by generating a pixel current according to a voltage between the gate and the source. The light-emitting element includes an anode, a cathode, and an organic compound layer formed between these electrodes. The organic compound layer can include a hole injection layer HIL, a hole transport layer HTL, an emission layer EML, an electron transport layer ETL, an electron injection layer EIL, etc. However, the disclosure is not limited thereto. When a pixel current flows through the light-emitting element, a hole passing through the hole transport layer HTL and an electron passing through the electron transport layer ETL move to the emission layer EML to form an exciton, and as a result, the emission layer EML can emit visible light.

Recently, an increasing number of attempts have been made to implement some of transistors included in a pixel circuit of the electroluminescent display device as oxide transistors. An oxide transistor uses an oxide referred to as IGZO, which is a combination of In (indium), Ga (gallium), Zn (zinc), and O (oxygen), instead of polysilicon as a semiconductor material.

The oxide transistor has lower electron mobility than that of a low-temperature poly-silicon (hereinafter referred to as LTPS) transistor, and has 10 or more times higher electron mobility than that of an amorphous silicon transistor. In terms of manufacturing cost, the oxide transistor is much more advantageous over the LTPS transistor while manufacturing cost of the oxide transistor is higher than that of the amorphous silicon transistor. In addition, a manufacturing process of the oxide transistor is similar to that of the amorphous silicon transistor, and thus there is an advantage of efficiency since existing facilities can be utilized. In particular, the oxide transistor has a low off-current, and thus has an advantage of high driving stability and reliability during low-speed driving in which an off-period of the transistor is relatively long. Therefore, the oxide transistor can be applied to a large liquid crystal display that requires high resolution and low-power driving or an OLED TV that cannot be formed in a large screen size through an LTPS process.

Like reference numbers designate substantially like elements throughout the specification. Hereinafter, embodiments of the present disclosure will be described in detail with reference to the accompanying drawings. In the following description, when it is determined that a detailed description of a known function or configuration related to the present disclosure can unnecessarily obscure the gist of the present disclosure, the detailed description will be omitted.

FIG. 1 is a block diagram schematically illustrating a configuration of a display device according to an embodiment of the present disclosure.

Referring to FIG. 1, the display device can include an image supply unit 110, a timing controller 120, a scan driver 130, a data driver 140, a display panel 150, a power supply unit 180, etc.

The image supply unit 110 can output various driving signals together with an image data signal supplied from the outside or an image data signal stored in an internal memory. The image supply unit 110 can supply the data signal and various driving signals to the timing controller 120.

In the display panel 150, a plurality of data lines DL1 to DLn extending in a column direction (or vertical direction) and a plurality of gate lines GL1 to GLm extending in a row direction (or horizontal direction) intersect each other, and subpixels SPs are disposed in a matrix in respective intersecting regions to form a pixel array. Here, n and m can be positive numbers such as integers greater than 1. Subpixels SP disposed on the same pixel line simultaneously operate according to a scan signal and an emission signal EM applied from the same gate line GL. Each subpixel SP includes a light-emitting element and a pixel circuit that controls the amount of current applied to an anode of the light-emitting element. The pixel circuit can include a driving transistor that controls the amount of current so that a certain current can flow through the light-emitting element. The light-emitting element emits light during an emission period and does not emit light during a period other than the emission period. In a period other than the emission period, initialization and programming of the pixel circuit, reset of the light-emitting element, etc. can be performed.

The timing controller 120 can output a gate timing control signal GDC for controlling operation timing of the scan driver 130, a data timing control signal DDC for controlling operation timing of the data driver 140, various synchronization signals (a vertical synchronization signal Vsync and a horizontal synchronization signal Hsync), etc. The timing controller 120 can supply a data signal DATA supplied from the image supply unit 110 to the data driver 140 together with the data timing control signal DDC. The timing controller 120 can be formed in the form of an integrated circuit (IC) and mounted on a printed circuit board. However, the present disclosure is not limited thereto.

The data driver 140 can sample and latch the data signal DATA in response to the data timing control signal DDC supplied from the timing controller 120, convert a digital data signal into an analog data voltage based on a gamma reference voltage, and output the analog data voltage. The data driver 140 can supply data voltages to subpixels included in the display panel 150 through the data lines DL1 to DLn. The data driver 140 can be formed in the form of an IC and mounted on the display panel 150 or mounted on a printed circuit board. However, the present disclosure is not limited thereto.

The scan driver 130 can output a scan signal and an emission signal in response to the gate timing control signal GDC supplied from the timing controller 120. The scan driver 130 can supply at least one scan signal and emission signal to each of the subpixels included in the display panel 150 through the gate lines GL1 to GLm. The scan driver 130 can be formed in the form of an IC or directly formed on the display panel 150 using a gate-in-panel method.

The power supply unit 180 can convert power supplied from the outside into power required for driving the display device and output the converted power under the control of the timing controller 120. For example, the power supply unit 180 can convert power supplied from the outside into a high-potential voltage EVDD, a low-potential voltage EVSS, etc. and output the converted voltage, and can generate and output a voltage required for driving the scan driver 130, a voltage required for driving the data driver 140, etc.

Such a display device can operate in a low-speed driving mode to reduce power consumption.

Figure 2:
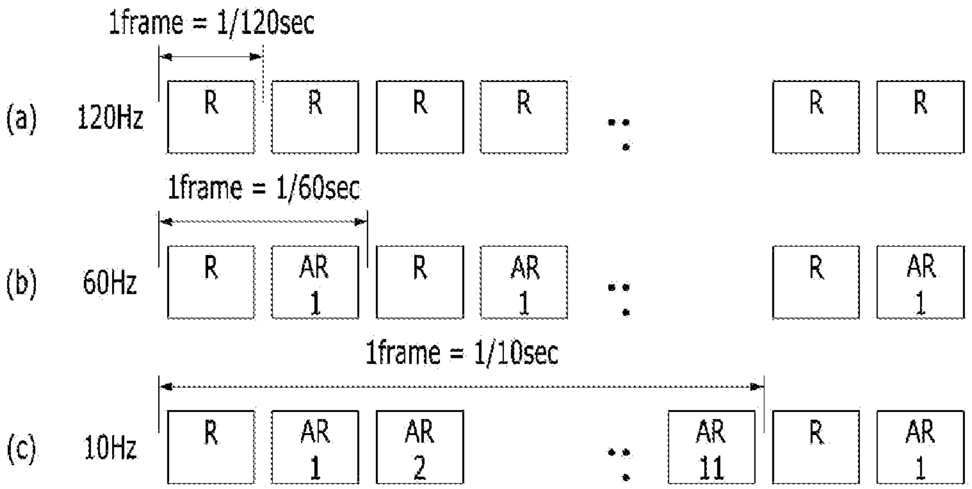
FIG. 2 is a diagram for describing a low-speed driving method of the display device.

FIG. 2 is a diagram for describing a low-speed driving method of the display device.

A low-speed driving mode can be set to reduce power consumption when an input image is analyzed, and the input image is not changed as much as the preset number of frames. For example, when a still image is input for a certain time or more, or a user command or an input image is not input to a display panel driving circuit for a predetermined time or more, refresh rates of pixels can be lowered to control data write periods of the pixels so that the data write periods are long, thereby reducing power consumption.

In a basic driving mode, the timing controller 120 supplies data voltages to the subpixels SP for each frame. On the other hand, in a low-speed driving mode, the subpixels SP are refreshed by applying the data voltages in a partial frame period, and the data voltages input in a refresh period are held without outputting the data voltages in a remaining frame period as a holding period. During the holding period, anode rest can be performed by applying a reset voltage to the anode of the OLED in order to prevent the luminance from fluctuating.

According to an example, (a) of FIG. 2 illustrates a configuration of frames during a basic driving. During a 120 Hz driving, 120 frames are reproduced in 1 second, and a length of a subframe is 1/120 sec. Every frame can be configured as a refresh frame R in which a data voltage is written.

Further, (b) of FIG. 2 illustrates a configuration of frames during a 60 Hz driving. During the 60 Hz driving, 60 image frames are reproduced in 1 second. During the 60 Hz driving, one frame period is 1/60 sec, and thus one frame period can include two subframes. Accordingly, during the 60 Hz driving, a first frame can be configured as a refresh frame R, and a subsequent frame can be configured as an anode reset frame AR.

Moreover, (c) of FIG. 2 illustrates a configuration of frames during a 10 Hz driving. During the 10 Hz driving, 10 image frames are reproduced in 1 second. During the 10 Hz driving, one frame period is 1/10 sec, and thus one frame period can include 12 subframes. As such, during the 10 Hz driving, one frame period can include one refresh frame R and 11 anode reset frames AR.

Figure 3:
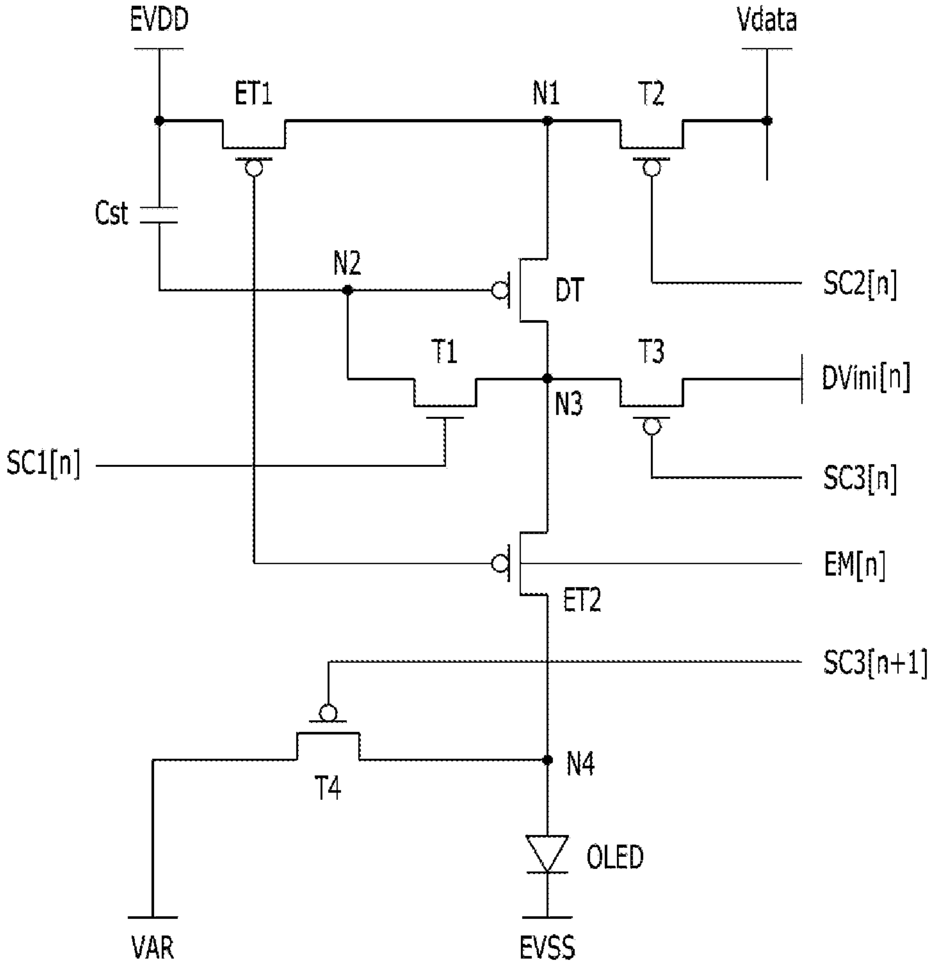
FIG. 3 is an equivalent circuit diagram of one subpixel included in the display device of FIG. 1.

FIG. 3 is an equivalent circuit diagram of one subpixel included in the display device of FIG. 1.

In the following description, a first electrode of a transistor can be any one of a source electrode and a drain electrode, and a second electrode of the transistor can be the other one of the source electrode and the drain electrode.

The high-potential voltage EVDD, the low-potential voltage EVSS, an initialization voltage DVini, and an anode reset voltage VAR can be supplied to one subpixel SP, and the one subpixel SP can receive input of first to third scan signals SC1 to SC3, the emission signal EM, and a data voltage signal Vdata.

Each of one or more subpixels SP can include an OLED, a driving TFT DT, a capacitor Cst, a first emission TFT ET1, a second emission TFT ET2, and first to fourth switching TFT T1 to T4.

Active layers included in the driving TFT DT and the switching TFTs ET1, ET2, and T1 to T4, respectively, can be made of the same material or different materials. When the driving TFT DT and the switching TFTs ET1, ET2, and T1 to T4 are configured as TFTs having different characteristics in one subpixel SP, an organic light-emitting display device can include multiple TFT types.

The subpixel SP including the multiple TFT types can include an LTPS TFT using LTPS, which is a TFT using a polycrystalline semiconductor material as an active layer, and an oxide semiconductor TFT using an oxide semiconductor material as an active layer. The LTPS TFT has high mobility (100 $cm^2/Vs$ or more), low energy consumption, and excellent reliability, and thus can be desirably applied as a driving TFT. The oxide semiconductor TFT has a low off-current, thus has low leakage current, and has excellent voltage holding characteristics. Therefore, the oxide TFT can be suitable for a switching TFT that has a short turn-on time and maintains a long turn-off time.

The subpixels SP according to the embodiment of the present disclosure include a subpixel SP in which the first TFT T1 is configured as an n-type oxide TFT, and the remaining driving TFT DT, emission TFTs ET1 and ET2, and second to fourth TFTs T2 to T4 are configured as p-type LTPS TFTs. However, the present disclosure is not limited thereto.

Scan signals SC1[*n*], SC2[*n*], and SC3[*n*] and an emission signal ET[n] provided to the subpixel SP are signals provided in an nth stage included in the gate driver 130, and a scan signal SC3[*n*+1] is a signal provided in an (n+1)th stage.

The OLED emits light by driving current supplied from the driving TFT DT. The OLED has an anode connected to a fourth node N4, and has a cathode connected to a wire provided with the low-potential voltage EVSS.

The driving TFT DT has a gate electrode connected to a second node N2, a first electrode connected to a first node N1, and a second electrode connected to a third node N3. The driving TFT DT can generate driving current in response to the data voltage signal Vdata. The driving TFT DT can be implemented as a p-type LTPS TFT.

The first emission TFT ET1 and the second emission TFT ET2 serve to control emission of the OLED. The first emission TFT ET1 and the second emission TFT ET2 are controlled so that the emission TFTs are simultaneously turned on/off according to the emission signal EM[n] simultaneously input to respective gate electrodes thereof. The first emission TFT ET1 can have a first electrode connected to the high-potential voltage EVDD and a second electrode connected to the first node N1. The first emission TFT ET1 can serve to transfer the high-potential voltage EVDD to the first electrode of the driving TFT DT in response to the emission signal EM[n] provided in the nth stage. The second emission TFT ET2 can have a first electrode connected to the third node N3 and a second electrode connected to the fourth node N4. The second emission TFT ET2 can serve to transfer a driving current to the anode of the OLED in response to the emission signal EM[n] provided in the nth stage. Each of the first emission TFT ET1 and the second emission TFT ET2 can be implemented as a p-type LTPS TFT. Accordingly, the first emission TFT ET1 and the second emission TFT ET2 can be turned on in response to the emission signal EM[n] at a low level, which is a turn-on voltage.

The storage capacitor Cst maintains a data voltage Vdata stored in the subpixel SP for one frame. The storage capacitor Cst has one electrode connected to the second node N2 to which the gate electrode of the driving TFT DT is connected, and the other electrode connected to the high-potential voltage EVDD.

The first switching TFT T1 connects the gate electrode and the second electrode of the driving TFT DT to diode-connect the driving TFT DT. The first switching TFT T1 can include a gate electrode connected to an input line of the first scan signal SC1[*n*], a first electrode connected to the second node N2, and a second electrode connected to the third node N3. The first switching TFT T1 can be implemented as an n-type oxide TFT to minimize leakage current during a turn-off period. Accordingly, the first switching TFT T1 diode-connects the gate electrode and the second electrode of the driving TFT DT in response to the first scan signal SC1[*n*] at a high level, which is a turn-on voltage.

The second switching TFT T2 applies the data voltage signal Vdata to the first node N1, which is the first electrode of the driving TFT DT. The second switching TFT T2 can include a gate electrode connected to an input line of the second scan signal SC2[*n*], a first electrode connected to a data line through which the data voltage signal Vdata is supplied, and a second electrode connected to the first node N1. The second switching TFT T2 can be implemented as a p-type LTPS TFT. Accordingly, the second switching TFT T2 applies the data voltage signal Vdata supplied through the data line to the first node N1, which is the first electrode of the driving TFT DT, in response to the second scan signal SC2[*n*] at a low level, which is a turn-on voltage.

The third switching TFT T3 applies the initialization voltage DVini[n] to the third node N3, which is the second electrode of the driving TFT DT. The third switching TFT T3 can include a gate electrode connected to an input line of the third scan signal SC3[*n*], a first electrode connected to the initialization voltage DVini[n], and a second electrode connected to the third node N3. The third switching TFT T3 can be implemented as a p-type LTPS TFT. Accordingly, the third switching TFT T3 applies the initialization voltage DVini[n] to the third node N3, which is the second electrode of the driving TFT DT, in response to the third scan signal SC3[*n*] at a low level, which is a turn-on voltage. Here, the initialization voltage DVini can be applied at a low voltage level Vini_L during initialization operation and applied as a high-voltage level Vini_H during OBS operation.

The fourth switching TFT T4 applies the anode reset voltage VAR to the anode of the OLED. The fourth switching TFT T4 can include a gate electrode connected to an input line of the third scan signal SC3[*n*+1] provided in the (n+1)th stage, a first electrode connected to the anode reset voltage VAR, and a second electrode connected to the fourth node N4. The fourth switching TFT T4 can be implemented as a p-type LTPS TFT. Accordingly, the fourth switching TFT T4 applies the anode reset voltage VAR to the anode of the OLED in response to the third scan signal SC3[*n*+1] provided in the (n+1)th stage at a low level, which is a turn-on voltage.

In the driving TFT DT of such a display device, a current Ids flows in the same direction according to Vgs during driving, and thus the threshold voltage Vth can vary as a driving time increases. This dependency of the threshold voltage Vth on a value of Vgs can be referred to as "hysteresis".

Figure 4:
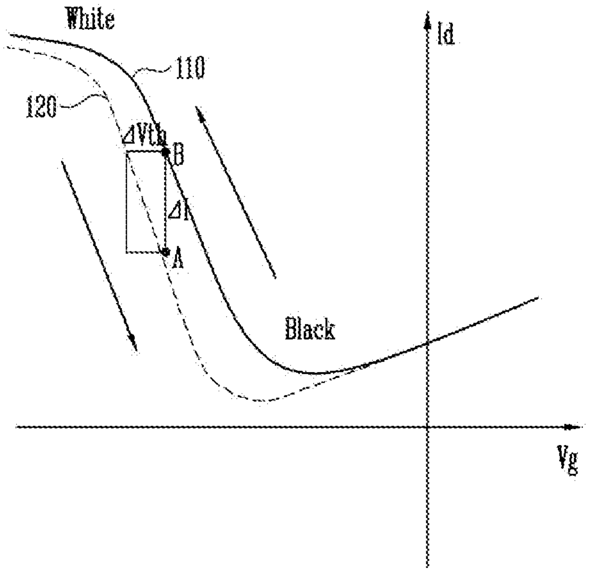
FIG. 4 is a diagram for describing hysteresis characteristics of a driving thin film transistor (TFT)

FIG. 4 is a diagram for describing hysteresis characteristics of the driving TFT DT.

Referring to FIG. 4, the driving TFT DT of the OLED has a hysteresis characteristic in which a current Id changes according to a change in a gate voltage Vg as illustrated in FIG. 4. For example, when brightness of a pixel changes from a high gradation (for example, white gradation) to an intermediate gradation, an absolute value (|Vg|) of the gate voltage of the driving TFT DT changes from a large value to a small value as indicated by 120. At this time, since the gate voltage (|Vg|) having a relatively large absolute value at the high gradation is first applied to the driving TFT DT, when the gate voltage Vg corresponding to the intermediate gradation is applied to the driving TFT DT in a state in which the threshold voltage |Vth| of the driving TFT DT is increased, the current Id of the driving transistor can be the same as point "A".

Further, when the brightness of the pixel changes from a low gradation (for example, black gradation) to an intermediate gradation, the absolute value (|Vg|) of the gate voltage of the driving TFT DT changes from a small value to a large value as indicated by 110. At this time, since the gate voltage (|Vg|) having a relatively small absolute value at the low gradation is first applied to the driving TFT DT, when the voltage Vg corresponding to the intermediate gradation is applied to the driving transistor in a state in which the absolute value |Vth| of the threshold voltage of the driving TFT DT is decreased by ΔVth, the current Id of the driving transistor can be the same as point "B". Therefore, due to the driving TFT DT having the hysteresis characteristic illustrated in FIG. 4, even when the same gate voltage Vg is applied to the driving TFT DT to express the brightness of the intermediate gradation, a current having different magnitude by ΔI flows depending on the previous brightness of the corresponding pixel. Further, such a current difference can cause a screen afterimage or flickering.

In order to alleviate hysteresis of the driving TFT DT, a flickering phenomenon caused by hysteresis can be suppressed by applying a turn-on bias to the driving TFT DT.

Figure 5:
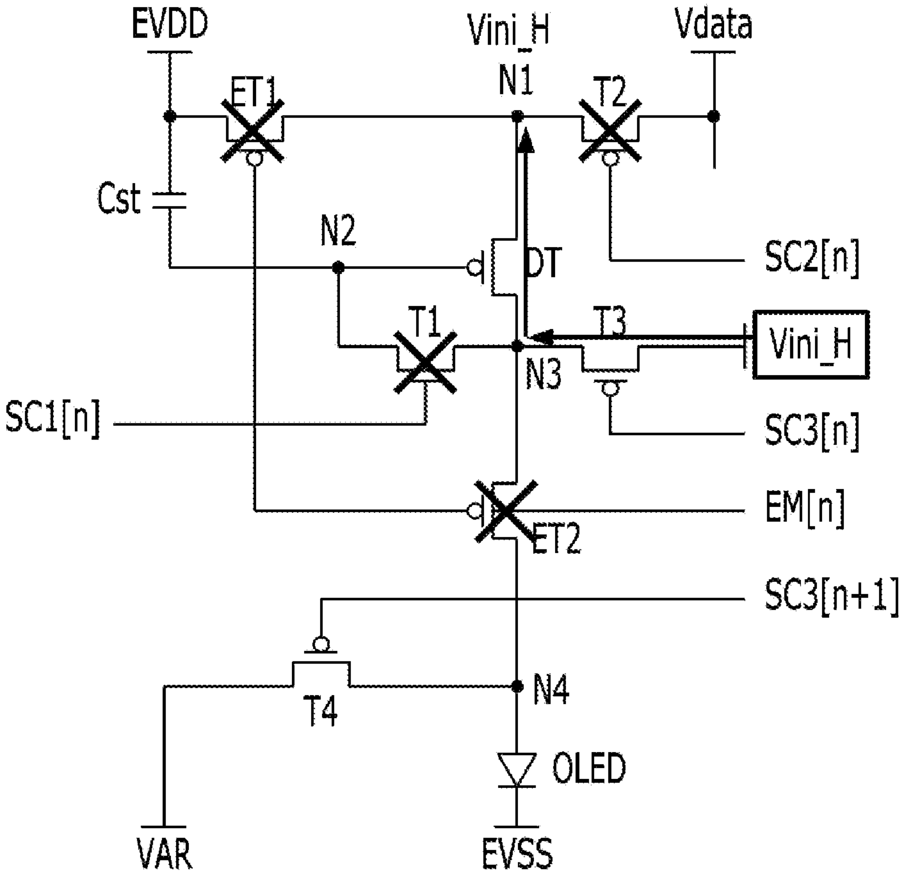
FIG. 5 is a diagram for describing a driving method of the driving TFT during on-bias stress (OBS) driving.

FIG. 5 is a diagram for describing a driving method of the driving TFT during OBS driving.

Referring to FIG. 5, in the embodiment of the present disclosure, the third scan signal SC3 is applied at a turn-on level during an OBS period to turn on the third switching TFT T3, which applies the initialization voltage DVini to the second electrode of the driving TFT DT. Here, the initialization voltage DVini is applied at the low voltage level Vini_L during initial operation and applied at a high voltage level Vini_H during OBS operation. The initialization voltage DVini at the high voltage level Vini_H applied during the OBS operation can be set higher than the data voltage Vdata.

During the OBS operation, when the initialization voltage DVini at the high voltage level Vini_H is applied to the second electrode of the driving TFT DT as a bias voltage, the threshold voltage Vth of the driving TFT DT moves, and thus hysteresis can be alleviated.

Figure 6:
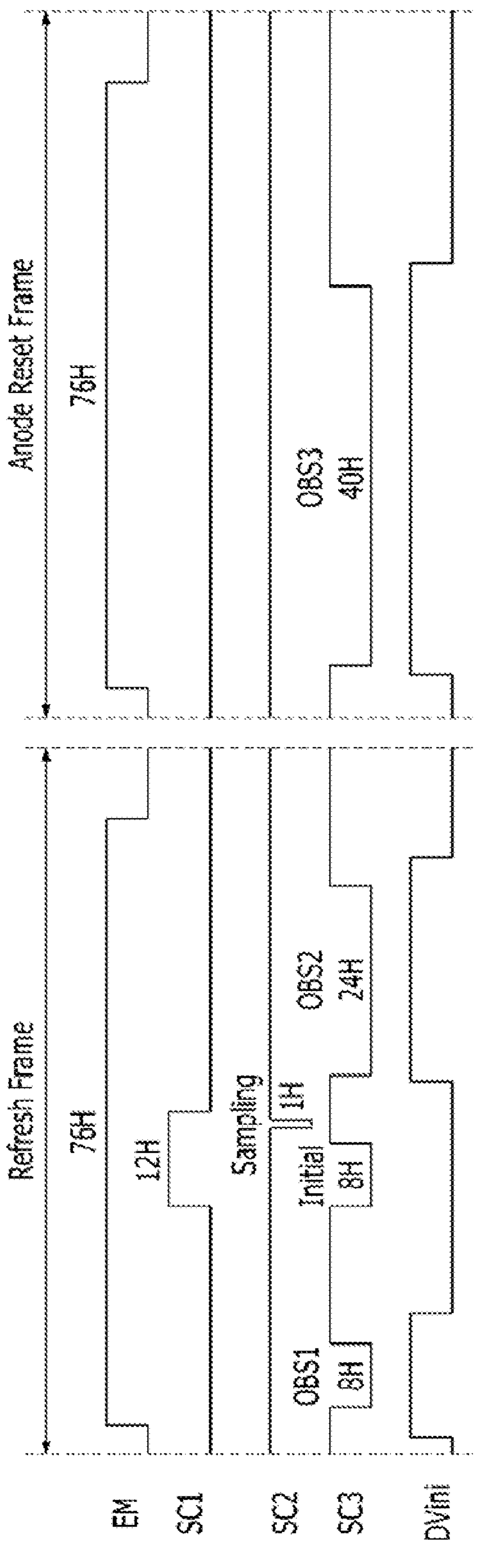
FIG. 6 is a diagram illustrating driving waveforms of the subpixel of FIG. 3.

FIG. 6 is a diagram illustrating driving waveforms of the subpixel of FIG. 3.

Referring to FIG. 6, the subpixel SP according to the embodiment of the present disclosure can perform refresh frame driving or anode reset frame driving.

During a refresh frame driving, in a non-emission period in which the emission signal EM is applied at an off level, the initial and sampling operations for programming the data voltage in the subpixel SP are performed. During an anode reset frame driving, the operation for programming the data voltage is not performed.

A driving period of the refresh frame and the anode reset frame can include a plurality of OBS periods. In each of the OBS periods, the flickering phenomenon due to hysteresis can be suppressed effectively by applying a turn-on bias to the driving TFT DT. In the embodiment of the present disclosure, the third scan signal SC3 is applied at a turn-on level during the OBS period to turn on the third switching TFT T3 for applying the initialization voltage DVini to the second electrode of the driving TFT DT. Here, the initialization voltage DVini is applied at the low voltage level Vini_L during initial operation and applied at a high voltage level Vini_H during OBS operation. During the OBS operation, when the initialization voltage DVini at the high voltage level Vini_H is applied to the driving TFT DT as a bias voltage, the threshold voltage Vth of the driving TFT DT moves, and hysteresis can be alleviated.

When a detailed operation during a refresh frame driving is examined, a first OBS period OBS1, an initial period Initial, a sampling period Sampling, and a second OBS period OBS2 can be included during a non-emission period in which the emission signal EM is applied at an off level.

During the first OBS period OBS1, the third scan signal SC3 is applied at a turn-on level, so that the third switching TFT T3 is turned on. The initialization voltage DVini at the high voltage level Vini_H is input to the third node N3, which is the second electrode of the driving TFT DT, through the turned-on third switching TFT T3, so that OBS can be applied to the driving TFT DT. The initialization voltage DVini at the high voltage level Vini_H can be higher than the data voltage Vdata. This first OBS period OBS1 can be performed for a relatively shorter period 8H when compared to other OBS periods.

During the initial period Initial and the sampling period Sampling, the first scan signal SC1 is applied at a high level, which is a turn-on voltage. The first switching TFT T1 is turned on by the first scan signal SC1 to connect the third node N3 and the second node N2 to each other. Accordingly, the driving TFT DT is in a diode-connected state in which the gate electrode and the drain electrode are short-circuited to operate as a diode.

During the initial period Initial, the third scan signal SC3 is applied at a turn-on level to turn on the third switching TFT T3, and during the initial period Initial, the initialization voltage DVini at the low voltage level Vini_L is applied. Accordingly, the third node N3, which is the second electrode of the driving TFT DT and the second node N2 are each initialized to the initialization voltage DVini at the low voltage level Vini_L. The initialization voltage DVini at the low voltage level Vini_L can be selected within a voltage range sufficiently lower than an operating voltage of the OLED, and can be set to a voltage equal to or less than the low-potential voltage EVSS.

The sampling period is a period during which the threshold voltage Vth of the driving TFT DT is sampled and the data voltage Vdata is programmed. During the sampling period Sampling, the second scan signal SC2 is applied at a low level, which is a turn-on voltage. In response to the second scan signal SC2 at the low level, which is the turn-on voltage, the second switching TFT T2 applies the data voltage signal Vdata applied from the data line to the first node N1, which is the first electrode of the driving TFT DT. During the sampling period Sampling, the driving TFT DT is turned on and a current Ids flows between the source and drain. Since the gate electrode and drain electrode of the driving TFT DT are in a diode-connected state, a voltage at the second node N2 rises until a voltage Vgs between the gate and the source of the driving TFT DT reaches the threshold voltage Vth due to a current flowing from the source electrode to the drain electrode. During the sampling period Sampling, the second node N2 is charged with a voltage (Vdata−|Vth|) corresponding to a difference between the data voltage Vdata and the threshold voltage Vth of the driving TFT DT.

During the second OBS period OBS2, the third scan signal SC3 is applied at a turn-on level, so that the third switching TFT T3 is turned on. The initialization voltage DVini is converted into the high voltage level Vini_H for OBS and applied to the third node N3, which is the second electrode of the driving TFT DT. The second OBS period OBS2 can be performed for a longer period 24H than the first OBS period OBS1.

Thereafter, when the emission signal EM is applied at a low level, which is a turn-on voltage, the first emission TFT ET1 and the second emission TFT ET2 are turned on. As the first emission TFT ET1 is turned on, the high-potential voltage EVDD is applied to the first node N1. Further, as the second emission TFT ET2 is turned on, a current path of the third node N3 and the fourth node N4 is formed. Thus, a driving current Ioled generated through the source electrode and the drain electrode of the driving TFT DT is applied to the OLED, so that light can be emitted.

In the anode reset frame, charging with the data voltage Vdata is not performed. Thus, the first scan signal SC1 and the second scan signal SC2, which are applied for driving in the initial period Initial and the sampling period Sampling, are each maintained at an off-voltage level. The anode reset frame can include a third OBS period OBS3. During the third OBS period OBS3, the third scan signal SC3 is applied at a turn-on level, so that the third switching TFT T3 is turned on. The initialization voltage DVini is converted into the high voltage level Vini_H for OBS and applied to the third node N3, which is the second electrode of the driving TFT DT. During the third OBS period OBS3, the fourth switching TFT T4 for applying the anode reset voltage VAR can be turned on by the third scan signal SC3[*n*+1] in a subsequent stage. When the fourth switching TFT T4 is turned on, the anode electrode of the OLED is reset by the anode reset voltage VAR, so that light-emitting characteristics of the OLED can be maintained the same.

As described above, the refresh frame and the anode reset frame can include a plurality of OBS periods OBS1 to OBS3, and if necessary, the OBS periods can be extended or additional OBS can be performed.

Here, since driving of each of the OBS periods OBS1 to OBS3 is different among the OBS periods, even when OBS is performed during the same period, a hysteresis improvement effect of the driving TFT DT in each OBS period can be different. Luminance characteristics can fluctuate between frames due to such a difference in effect of OBS. In addition, as the OBS progresses, Vth of the driving TFT DT shifts, so that Vgs of the driving TFT DT decreases. As a result, a current drop can occur. A current drop phenomenon can cause luminance deterioration, and flickering can increase as a result.

Accordingly, flickering can be relieved by adjusting the length of each of the OBS periods OBS1 to OBS3 according to flickering characteristics.

The first OBS period OBS1 can be performed immediately after the emission signal EM is applied at an off level and before Vth sampling and data programming. The first OBS period OBS1 is performed immediately after a previous frame emits light, and hysteresis according to the voltage of the second node N2 in the previous frame is alleviated to improve a response speed of a first frame (first frame response (FFR)). Since the first OBS period OBS1 has an effect of improving the response speed of the first frame (FFR), it is desirable to maintain the first OBS period as a certain period without changing settings.

The second OBS period OBS2 can be performed after data writing and before a light emitting step, and the third OBS period OBS3 can be performed during an anode reset period in which data written in the refresh period is maintained. For example, since the second OBS period OBS2 and the third OBS period OBS3 are performed in a state where the same data voltage is written, flickering relieving performance can be improved as identity of Vth shifted in the second OBS period OBS2 and the third OBS period OBS3 increases. Accordingly, the length of each OBS period, for example, the signal width, can be adjusted so that Vth shift results of the second OBS period OBS2 and the third OBS period OBS3 match.

The second OBS period OBS2 and the third OBS period OBS3 can be set according to flickering characteristics of the display device, and flickering relieving performance can be improved as the second OBS period OBS2 decreases, and the third OBS period OBS3 increases.

Figure 7:
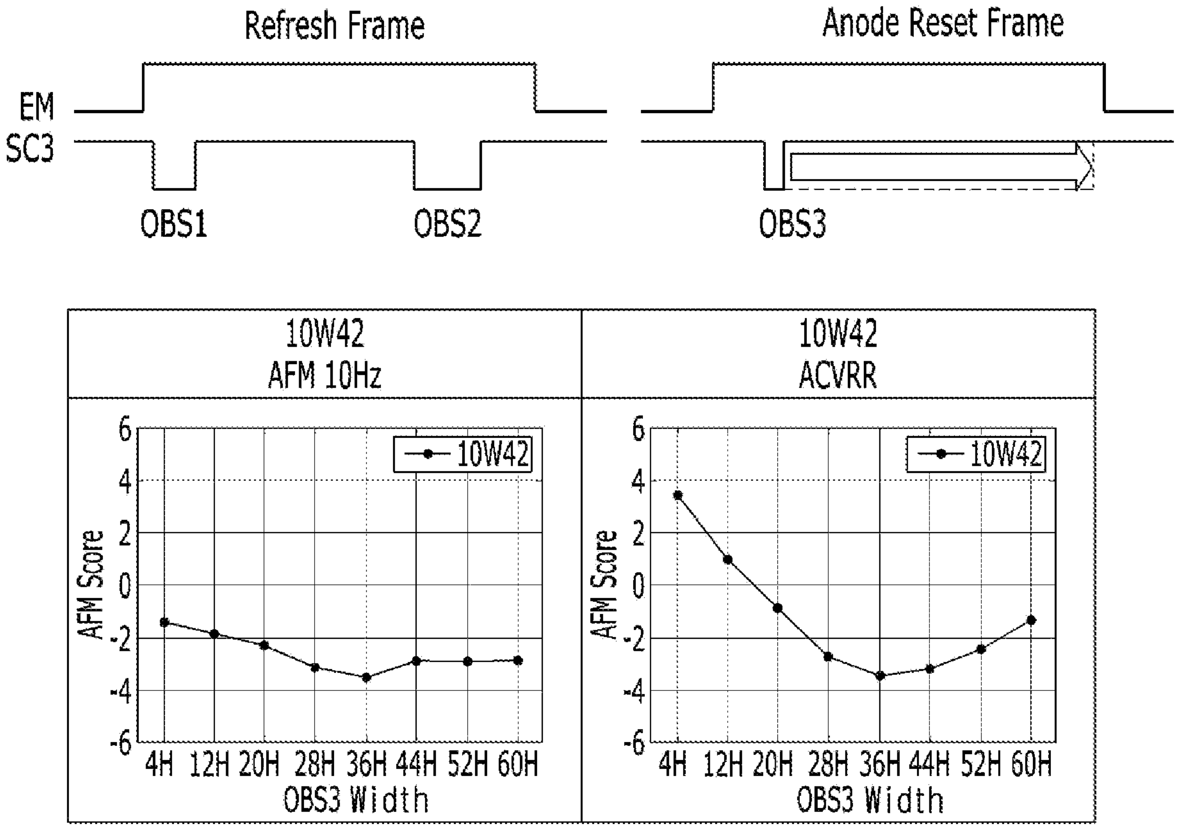
FIG. 7 is a diagram illustrating a flickering test result according to a length of a third OBS period.

FIG. 7 is a diagram illustrating an example of a flickering test result according to a length of the third OBS period OBS3.

FIG. 7 illustrates a graph simulating a flicker value (AFM Score) when a width of the third OBS period OBS3 increases from 4H to 60H in an environment where 10W42 white is displayed and a low-speed driving is performed at 10 Hz (AFM 10 Hz), and a graph simulating a flicker value (AFM Score) when the width of the third OBS period OBS3 increases from 4H to 60H in an environment where the driving frequency is variable (ACVRR).

As a result of the simulation, it can be seen that, as the signal width of the third OBS period OBS3 increases up to a predetermined point, the effect of relieving the flicker value (AFM Score) is improved.

Figure 8:
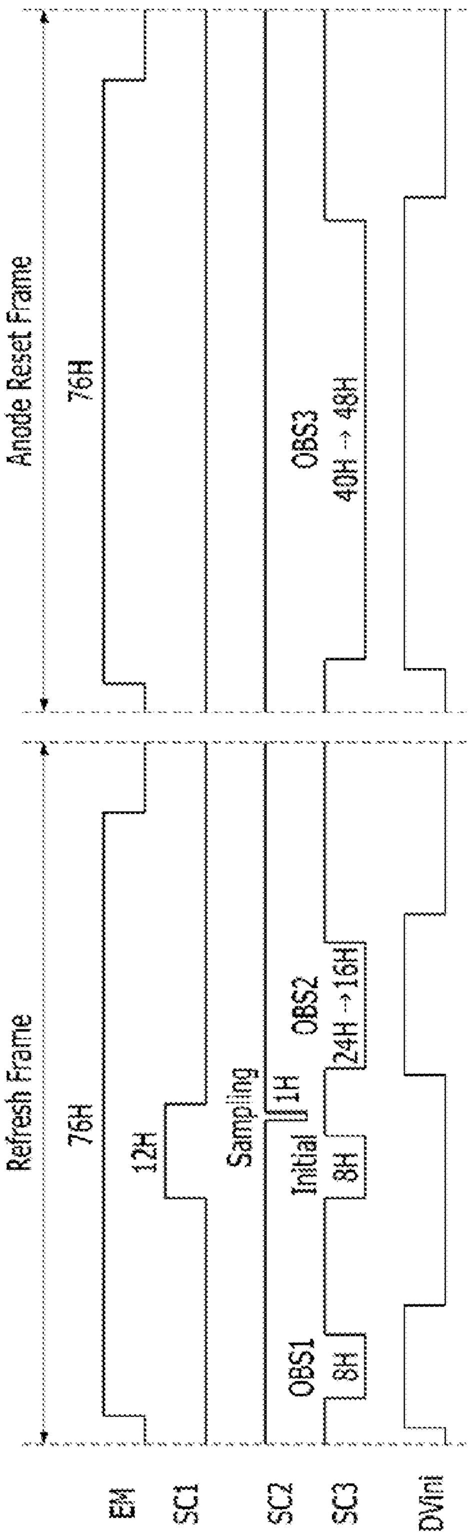
FIG. 8 is a diagram illustrating driving waveforms of the subpixel according to an embodiment of the present disclosure.

FIG. 8 is a diagram illustrating driving waveforms of the subpixel according to an embodiment of the present disclosure, and is a diagram illustrating driving waveforms capable of relieving flickering when compared to FIG. 6.

Referring to FIG. 8, in order to match Vth shift results of the second OBS period OBS2 and the third OBS period OBS3, the second OBS period OBS2, which has been set to 24H corresponding to about 31.5% of the total non-emission period, could be decreased to 16H (21.05%), and the third OBS period OBS3, which has been set to 40H corresponding to about 52.63% of the total non-emission period, could be increased to 48H (63.15%). Roughly, the flickering relieving effect can be improved by setting the second OBS period OBS2 to be less than 30% of the total non-emission period and setting the third OBS period OBS3 to be 60% or more of the total non-emission period.

In addition, when the second OBS period OBS2 is set to be ½ or less of the third OBS period OBS3, and the third OBS period OBS3 is set to be twice or more the second OBS period OBS2, a matching rate of the Vth shift results of the second OBS period OBS2 and the third OBS period OBS3 is improved, so that the flickering relieving effect can be improved. Here, the length of each of the OBS periods OBS2 and OBS3 can be set by maintaining the sum of the second OBS period OBS2 and the third OBS period OBS3 constant, and adjusting only the proportions of the second OBS period OBS2 and the third OBS period OBS3. For example, as the luminance difference between the refresh frame and the anode reset frame increases, the proportion of the second OBS period OBS2 is decreased, and the proportion of the third OBS period OBS3 is increased, so that the flickering relieving effect can be improved.

FIG. 9 is an example of a simulation result of a current drop rate according to the driving waveforms of FIG. 8, and is a luminance decrease result calculated after performing high-temperature reliability at 60° C. for 504 hours for a W255 white pattern and a W63 white pattern. When compared to the luminance reduction rates of −10% and −22% in the respective patterns in the case where driving is performed with the existing driving patterns of FIG. 6 (or CASE I), it can be seen that the luminance reduction rates are relieved to −9% and −19% compared to the existing case in the case where driving is performed with the driving patterns of FIG. 8 according to the embodiment of the present disclosure (or CASE II).

As described above, when the second OBS period OBS2 is relatively decreased, and the third OBS period OBS3 is relatively increased, so that the second OBS period OBS2 is set to be ½ or less than the third OBS period OBS3, and the third OBS period OBS3 is set to be twice or more of the second OBS period OBS2, the matching rate of the Vth shift result between the second OBS period OBS2 and the third OBS period OBS3 is improved. In this way, it is possible to improve the flickering relieving effect. In addition, when the second OBS period OBS2 is set to be less than 30% of the total non-emission period, and the third OBS period OBS3 is set to be 60% or more of the total non-emission period, the flickering relieving effect can be improved.

The display device according to the embodiments of the present disclosure can be described as follows.

The display device according to one or more embodiments of the present disclosure can include a display panel including a plurality of subpixels with each subpixel including a light-emitting element, a data driver configured to supply a data voltage and an on-bias stress (OBS) voltage to each of the subpixels, a scan driver configured to output an emission signal for controlling a non-emission period and an emission period of the light-emitting element and an OBS signal for controlling an OBS period, and a controller, wherein the controller controls the data driver to supply the data voltage to each of the subpixels in the emission period to emit light and to supply the OBS voltage to each of the subpixels in the non-emission period during a first frame period, the controller controls the data driver to supply the OBS voltage to each of the subpixels in the non-emission period and maintain the data voltage supplied in the first frame period in the emission period to emit light during a second frame period, and the controller controls the scan driver to set an OBS period performed in the non-emission period of the second frame period to be twice or more longer than an OBS period performed nearest to the last emission period of the first frame period.

The controller of the display device according to one or more embodiments of the present disclosure can control the scan driver to set the OBS period performed nearest to the last emission period of the first frame period to be less than 30% of a total non-emission period of the first frame period, and set the OBS period performed in the non-emission period of the second frame period to be 60% or more of a total non-emission period of the second frame period.

In the display device according to one or more embodiments of the present disclosure, a sum of the OBS period performed nearest to the last emission period of the first frame period and the OBS period performed in the non-emission period of the second frame period can be constant.

In the display device according to one or more embodiments of the present disclosure, as a difference between a luminance in the first frame period and a luminance in the second frame period increases, a proportion of the OBS period performed nearest to the last emission period of the first frame period can decrease, and the OBS period performed in the non-emission period of the second frame period can increase.

In the display device according to one or more embodiments of the present disclosure, each of the subpixels can include the light-emitting element, a driving TFT configured to apply a driving current to the light-emitting element, an emission control TFT configured to receive input of the emission signal to connect the light-emitting element and the driving TFT to each other, and a switching TFT configured to receive input of the OBS signal to apply the OBS voltage to a drain of the driving TFT.

In the display device according to an embodiment of the present disclosure, each of the subpixels can include a driving TFT including a first electrode connected to a first node, a second electrode connected to a third node, and a gate electrode connected to a second node, the light-emitting element including an anode connected to a fourth node and a cathode connected to a low-potential voltage, a first emission control TFT and a second emission control TFT, the first emission control TFT including a gate electrode to which the emission signal is input to supply a high-potential voltage to the first node according to the emission signal, and the second emission control TFT connecting the second node and the fourth node to each other, a first switching TFT turned on by a first scan signal to connect the second node and the third node to each other, thereby diode-connecting the driving TFT, a second switching TFT turned on by a second scan signal to apply a data voltage signal to the first node, and a third switching TFT turned on by a third scan signal to apply an initialization voltage at a low voltage level or an OBS voltage at a high voltage level to the third node.

In the display device according to an embodiment of the present disclosure, the first switching TFT can include an n-type TFT having an oxide semiconductor active layer.

The display device according to an embodiment of the present disclosure can further include a fourth switching TFT turned on by a third scan signal in a subsequent stage to apply a reset voltage to the fourth node.

A method of driving a display device including a display panel including a plurality of subpixels with each subpixel including a light-emitting element according to an embodiment of the present disclosure includes supplying a data voltage to each of the subpixels in a emission period to emit light and to supply an OBS voltage to each of the subpixels in a non-emission period during a first frame period, and supplying an OBS voltage to each of the subpixels in a non-emission period and maintaining the data voltage supplied in the first frame period to emit light in an emission period during a second frame period, wherein an OBS period performed in the non-emission period of the second frame period can be set to be twice or more than an OBS period performed nearest to the last emission period of the first frame period.

In the method of driving the display device according to an embodiment of the present disclosure, the OBS period performed nearest to the last emission period of the first frame period can be set to be less than 30% of a total non-emission period of the first frame period, and the OBS period performed in the non-emission period of the second frame period can be set to be 60% or more of a total non-emission period of the second frame period.

In the method of driving the display device according to an embodiment of the present disclosure, a sum of the OBS period performed nearest to the last emission period of the first frame period and the OBS period performed in the non-emission period of the second frame period can be constant.

In the method of driving the display device according to an embodiment of the present disclosure, as a difference between a luminance in the first frame period and a luminance in the second frame period increases, a proportion of the OBS period performed nearest to the last emission period of the first frame period can decrease, and the OBS period performed in the non-emission period of the second frame period can increase.

The embodiments of the present disclosure can have various advantages and improved features including the following effects.

The embodiments of the present disclosure can provide a display device capable of improving image quality by preventing occurrence of flickering during a low-power driving for reducing power consumption and a method of driving the same.

The embodiments of the present disclosure can adjust a length of an OBS section performed in each of a refresh frame and an anode reset frame during a low-speed driving for reducing power consumption to reduce a luminance difference between frames, thereby preventing occurrence of flickering.

Effects according to the present disclosure are not limited by the contents illustrated above, and various more effects are included in this specification.

Even though the embodiments of the present disclosure have been described in more detail with reference to the accompanying drawings, the present disclosure is not necessarily limited to these embodiments, and can be variously modified and implemented without departing from the technical spirit of the present disclosure. Therefore, the embodiments disclosed herein are not intended to limit the technical spirit of the present disclosure but to describe the technical spirit, and the scope of the technical spirit of the present disclosure is not limited by these embodiments. Therefore, the embodiments described above should be understood as illustrative in all respects and not limiting. The protection scope of the present disclosure should be construed by the claims, and all technical ideas within the equivalent range should be construed as being included in the scope of the present disclosure.

What is claimed is:

1. A display device comprising:

a display panel including a plurality of subpixels, each of the subpixels including a light-emitting element;

a data driver configured to supply a data voltage and an on-bias stress (OBS) voltage to each of the subpixels;

a scan driver configured to output an emission signal for controlling a non-emission period and an emission period of the light-emitting element and an OBS signal for controlling an OBS period; and a controller, wherein the controller controls the data driver to supply the data voltage to each of the subpixels in the emission period to emit light and to supply the OBS voltage to each of the subpixels in the non-emission period during a first frame period, the controller controls the data driver to supply the OBS voltage to each of the subpixels in the non-emission period and maintains the data voltage supplied in the first frame period in the emission period to emit light during a second frame period, and the controller controls the scan driver to set an OBS period performed in the non-emission period of the second frame period to be twice or more longer than an OBS period performed nearest to the last emission period of the first frame period, wherein a sum of the OBS period performed nearest to the last emission period of the first frame period and the OBS period performed in the non-emission period of the second frame period is constant, and wherein, as a difference between a luminance in the first frame period and a luminance in the second frame period increases, a proportion of the OBS period performed nearest to the last emission period of the first frame period decreases, and the OBS period performed in the non-emission period of the second frame period increases.

2. The display device according to claim 1, wherein the controller controls the scan driver to:

set the OBS period performed nearest to the last emission period of the first frame period to be less than about 30% of a total non-emission period of the first frame period; and set the OBS period performed in the non-emission period of the second frame period to be equal to or greater than about 60% of a total non-emission period of the second frame period.

3. The display device according to claim 1, wherein each of the subpixels comprises:

the light-emitting element;

a driving thin film transistor (TFT) configured to apply a driving current to the light-emitting element;

an emission control TFT configured to receive the emission signal to connect the light-emitting element and the driving TFT to each other; and a switching TFT configured to receive the OBS signal to apply the OBS voltage to a drain of the driving TFT.

4. The display device according to claim 1, wherein each of the subpixels comprises:

a driving thin film transistor (TFT) including a first electrode connected to a first node, a gate electrode connected to a second node, and a second electrode connected to a third node;

the light-emitting element including an anode connected to a fourth node and a cathode connected to a low-potential voltage;

a first emission control TFT and a second emission control TFT, the first emission control TFT including a gate electrode to which the emission signal is input to supply a high-potential voltage to the first node according to the emission signal, and the second emission control TFT connecting the second node and the fourth node to each other;

a first switching TFT turned on by a first scan signal to connect the second node and the third node to each other, thereby diode-connecting the driving TFT;

a second switching TFT turned on by a second scan signal to apply a data voltage signal to the first node; and a third switching TFT turned on by a third scan signal to apply an initialization voltage at a low voltage level or an OBS voltage at a high voltage level to the third node.

5. The display device according to claim 4, wherein the first switching TFT includes an n-type TFT having an oxide semiconductor active layer.

6. The display device according to claim 4, further comprising a fourth switching TFT turned on by a third scan signal in a subsequent stage to apply a reset voltage to the fourth node.

7. A method of driving a display device including a display panel including a plurality of subpixels, each subpixel including a light-emitting element, the method comprising:

supplying a data voltage to each of the subpixels in an emission period to emit light and to supply an on-bias stress (OBS) voltage to each of the subpixels in a non-emission period during a first frame period; and supplying an OBS voltage to each of the subpixels in a non-emission period and maintaining the data voltage supplied in the first frame period to emit light in an emission period during a second frame period, wherein an OBS period performed in the non-emission period of the second frame period is set to be twice or more longer than an OBS period performed nearest to the last emission period of the first frame period, wherein a sum of the OBS period performed nearest to the last emission period of the first frame period and the OBS period performed in the non-emission period of the second frame period is constant, and wherein, as a difference between a luminance in the first frame period and a luminance in the second frame period increases, a proportion of the OBS period performed nearest to the last emission period of the first frame period decreases, and the OBS period performed in the non-emission period of the second frame period increases.

8. The method according to claim 7, wherein:

the OBS period performed nearest to the last emission period of the first frame period is set to be less than about 30% of a total non-emission period of the first frame period, and the OBS period performed in the non-emission period of the second frame period is set to be equal to or greater than about 60% of a total non-emission period of the second frame period.

9. A display device comprising:

a display panel including a plurality of subpixels, each of the subpixels including a light-emitting element;

a data driver configured to supply a data voltage and an on-bias stress (OBS) voltage to each of the subpixels;

a scan driver configured to output an emission signal for controlling a non-emission period and an emission period of the light-emitting element and an OBS signal for controlling an OBS period; and a controller, wherein the controller controls the data driver to supply the data voltage to each of the subpixels in the emission period to emit light and to supply the OBS voltage to each of the subpixels in the non-emission period during a first frame period, the controller controls the data driver to supply the OBS voltage to each of the subpixels in the non-emission period and maintains the data voltage supplied in the first frame period in the emission period to emit light during a second frame period, the controller controls the scan driver to set an OBS period performed nearest to the last emission period of the first frame period to be less than about 30% of a total non-emission period of the first frame period, and the controller controls the scan driver to set an OBS period performed in the non-emission period of the second frame period to be equal to or greater than about 60% of a total non-emission period of the second frame period, wherein a sum of the OBS period performed nearest to the last emission period of the first frame period and the OBS period performed in the non-emission period of the second frame period is constant, and wherein, as a difference between a luminance in the first frame period and a luminance in the second frame period increases, a proportion of the OBS period performed nearest to the last emission period of the first frame period decreases, and the OBS period performed in the non-emission period of the second frame period increases.

10. The display device according to claim 9, wherein the controller controls the scan driver to set the OBS period performed in the non-emission period of the second frame period to be twice or more longer than the OBS period performed nearest to the last emission period of the first frame period.

* * * * *